(12) United States Patent
Vanni et al.

(10) Patent No.: US 9,188,212 B2
(45) Date of Patent: Nov. 17, 2015

(54) TWO-PIECE FLOW SEPARATION HUB (75) Inventors: Jeremy Vanni, Sterling, OH (US); Steven Olsen, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 765 days.

(21) Appl. No.: 12/948,505

(22) Filed: Nov. 17, 2010

(65) Prior Publication Data
US 2011/0120829 A1    May 26, 2011

Related U.S. Application Data (60) Provisional application No. 61/263,039, filed on Nov. 20, 2009.

(51) Int. Cl.
F16H 45/02 (2006.01)

(52) U.S. Cl.
CPC .......... F16H 45/02 (2013.01); *F16H 2045/021* (2013.01); *F16H 2045/0284* (2013.01); *Y10T 403/25* (2015.01)

(58) Field of Classification Search
CPC .................. F16H 2045/021; F16H 2045/0284; Y10T 403/25
USPC .................................................. 192/3.29, 3.3
See application file for complete search history.

(56) References Cited

U.S. PATENT DOCUMENTS

| | | | |
|---|---|---|---|
| 5,699,887 A | 12/1997 | Kundermann | |
| 6,290,041 B1 | 9/2001 | Bechmann et al. | |
| 6,454,074 B1 * | 9/2002 | Kundermann et al. | .. 192/48.618 |
| 6,837,349 B2 | 1/2005 | Bauer et al. | |
| 2005/0061596 A1 * | 3/2005 | Tsuzuki et al. | ................ 192/3.3 |
| 2006/0124420 A1 | 6/2006 | Ackermann | |
| 2006/0144665 A1 * | 7/2006 | Janson et al. | ................ 192/48.8 |
| 2007/0144161 A1 | 6/2007 | Marathe et al. | |
| 2007/0287581 A1 | 12/2007 | Parks et al. | |
| 2008/0142325 A1 | 6/2008 | Degler et al. | |

FOREIGN PATENT DOCUMENTS

| | | |
|---|---|---|
| DE | 19508613 | 9/1996 |
| DE | 10115454 | 8/2002 |
| EP | 1672254 | 6/2006 |
| GB | 2069632 | 8/1981 |
| JP | 51117275 | 10/1976 |

* cited by examiner

*Primary Examiner* — Terry Chau
(74) *Attorney, Agent, or Firm* — Simpson & Simpson, PLLC

(57) ABSTRACT

A flow separation hub including a first hub component, a second hub component affixed to the first hub component, a first passage arranged through the first and second hub components for enabling a first fluid to flow through the flow separation hub, a second passage arranged through the first and second hub components for enabling a second fluid to flow through the hub, wherein the hub prohibits fluid communication between the first and second fluids when the first and second fluids flow through the hub.

7 Claims, 11 Drawing Sheets

Fig. 17

TWO-PIECE FLOW SEPARATION HUB

CROSS-REFERENCE TO RELATED APPLICATIONS

This application claims the benefit under 35 U.S.C. §119 (e) of U.S. Provisional Application No. 61/263,039 filed Nov. 20, 2009.

FIELD OF THE INVENTION

The invention broadly relates to torque converters, more specifically to flow separation hubs used in torque converters, and, even more particularly, to a two-piece flow separation hub for use in a torque converter.

BACKGROUND OF THE INVENTION

Torque converters are well known in the art, and generally include a pump, turbine, and stator to regulate torque transferred from an engine of an automobile to a transmission of the automobile. Some torque converters require an independent fluid circuit for the control of a clutch, such as a lock-up clutch between a piston plate and a cover of the torque converter.

An example of such a torque converter is disclosed in U.S. Pat. No. 6,837,349 (Bauer et al.). This torque converter includes a hub having a plurality of fluid channels for directing the flow of fluid through the torque converter, particularly fluid contacting an actuating piston of the torque converter. Currently, similar hubs are forged and then passages or channels are machined into the hubs, such as by drilling or milling. These machining processes require additional time, cost, material, and maintenance of cutting tools. Since a die is usually required for the forging process, it would be advantageous if a design for a hub could be developed where the passages are integrated into the design of the hub and die, so that additional machining is not required. Therefore, what is needed is a hub which can be formed without unnecessary machining operations.

BRIEF SUMMARY OF THE INVENTION

The present invention broadly comprises a flow separation hub including a first hub component, a second hub component affixed to the first hub component, a first passage arranged through the first and second hub components for enabling a first fluid to flow through the flow separation hub, and a second passage arranged through the first and second hub components for enabling a second fluid to flow through the hub, wherein the hub prohibits fluid communication between the first and second fluids when the first and second fluids flow through the hub.

In one embodiment, the flow separation hub further comprises a hollow protrusion affixed between opposing faces of the first and second hub components, wherein the opposing faces are spaced apart from each other for defining the second passage between the opposing faces, wherein the hollow protrusion is operatively affixed between the first and second hub components at a discrete location for enabling the second fluid to flow around the hollow protrusion when the second fluid is traversing the second passage, and wherein the first passage is defined within the hollow protrusion.

In one embodiment, the first and second hub components are each formed by a stamping process. In one embodiment, the first hub component includes a first bore and a second bore, the second hub component includes a third bore and a fourth bore, wherein the first and second hub components are matingly engaged at an interface, the first bore is aligned with the third bore at the interface, the second bore is aligned with the fourth bore at the interface, the first and second hub components are affixed together at the interface, and wherein the first passage comprises the first and third bores, and the second passage comprises the second and fourth bores.

In one embodiment, the first hub component further comprises a first channel extending radially from an outer diameter of the first component to the first bore, and a second channel extending radially from an inner diameter of the first component to the second bore. In one embodiment, the first and second hub components are each formed by a powder metal sintering process. In one embodiment, the first hub component comprises a projection operatively arranged for affixing the flow separation hub to a cover of a torque converter, wherein the projection separates the first passage from the second passage. In one embodiment, the flow separation hub comprises first and second opposite axial sides, an inner diameter, and an outer diameter, wherein the first passage enables fluid communication between the first and second axial sides of the flow separation hub, and the second passage enables fluid communication between the inner and outer diameter of the hub.

The current invention also broadly comprises a torque converter including a cover, a flow separation hub as described above, housed within the cover and affixed to the cover, a piston plate having first and second axial sides housed within the cover, a first fluid chamber bounded by the first axial side of the piston plate and the first axial side of the flow separation hub, a second fluid chamber defined between the second axial side of the piston plate and a backing plate, a third fluid chamber bounded by the second axial side of the flow separation hub, a hollow input shaft in driving connection with the cover, the hollow input shaft defining a fourth fluid chamber therein, wherein the first fluid chamber is in fluid communication with the third fluid chamber via the first passage in the flow separation hub, and the second fluid chamber is in fluid communication with the fourth fluid chamber via the second passage in the flow separation hub.

In one embodiment, the piston plate is dynamically sealed on an outer diameter of the first hub component, the backing plate is sealed on an outer diameter of the second hub component, and the input shaft is sealed directly or indirectly on an inner diameter of the first hub component.

The current invention also broadly comprises a hub assembly for a torque converter including a first component, a second component fixedly connected to the first component, and at least one fluid passage extending through the first component and the second component. In one embodiment, the first component is arranged to be sealed to a piston plate for the torque converter and the second component is arranged to be sealed to an input shaft for a transmission. In one embodiment, at least one of the first component or the second component includes a spline or tab for driving engagement with a piston plate for the torque converter.

In one embodiment, the first and second components are connected by brazing or projection welding. In one embodiment, the at least one fluid passage comprises a first fluid passage and a second fluid passage, and projection welding the first and second components separates the first fluid passage from the second fluid passage. In one embodiment, the hub assembly further includes a cover, wherein at least one of the first and second components is fixed to the cover by projection welding when the first component is projection welded to the second component.

In one embodiment, the hub assembly further includes a cover, wherein the at least one fluid passage comprises a first fluid passage connected to a first fluid chamber and a second fluid passage connected to a second fluid chamber, at least one of the first and second components comprises a protrusion, at least one of the first or second components is fixed to the cover by projection welding at the protrusion, and the protrusion separates the first and second fluid chambers. In one embodiment, the protrusion is angled with respect to the cover. In one embodiment, the hub assembly further comprises a hollow rivet, wherein the first and second components are connected by the hollow rivet. In one embodiment, the at least one fluid passage extends through the hollow rivet.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "diameter" may be used interchangeably with "surface" as appearing in the specification and claims to refer generally to the surface defined by the diameter of a component, typically the surfaces defined by the inner and outer diameters. Although any methods, devices or materials similar or equivalent to those described herein can be used in the practice or testing of the invention, the preferred methods, devices, and materials are now described.

Figure 1:
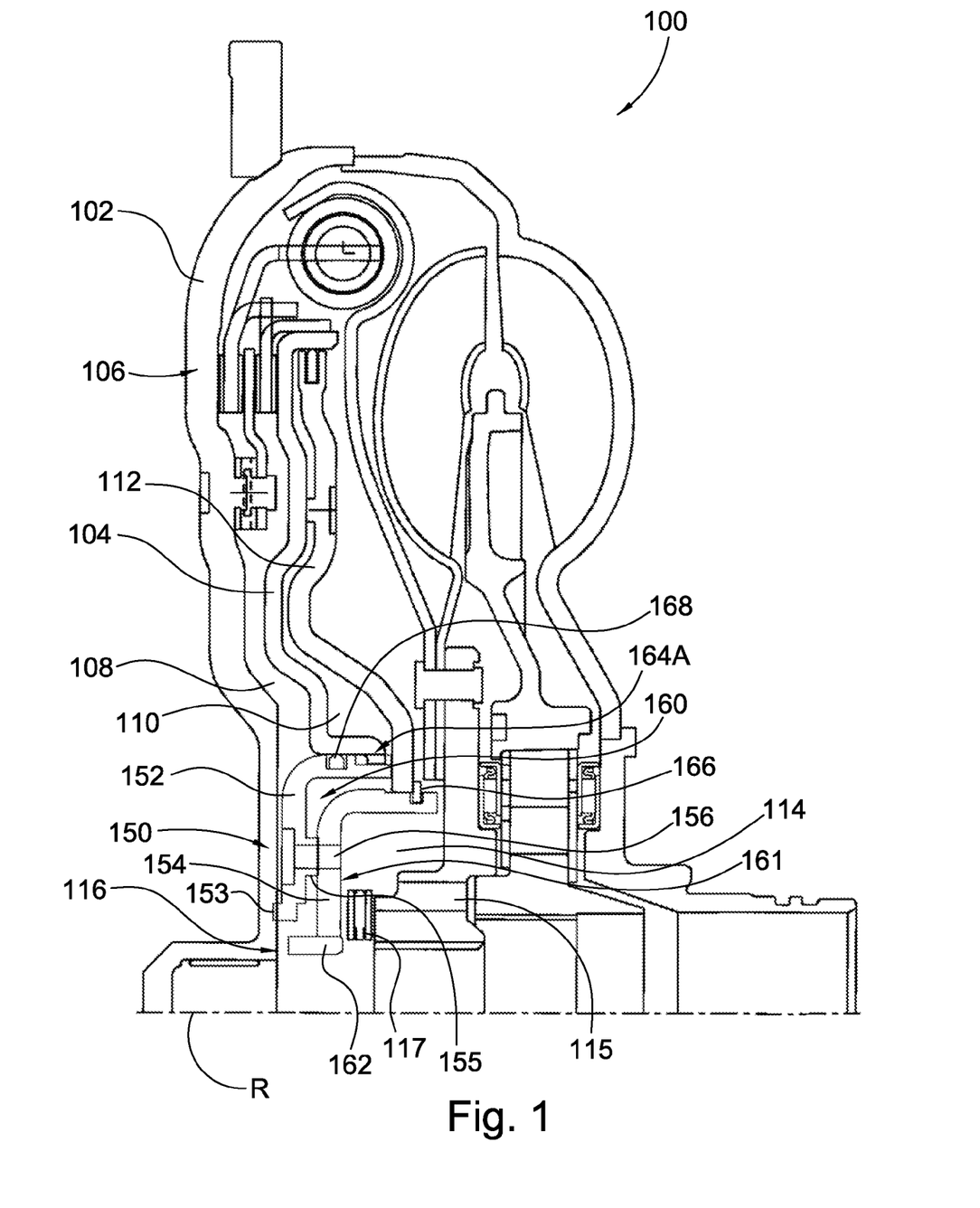
FIG. 1 is a cross-sectional view of a torque converter according to the current invention including a two-piece flow separation hub.

Referring now to the figures, FIG. 1 shows a cross-sectional view of a torque converter according to the current invention. Torque converter 100 includes a pump, turbine, stator, and other elements housed within a cover, specifically, cover 102. The torque converter transmits torque from an engine to an input shaft for a transmission of a vehicle. Torque converter 100 also includes piston plate 104 which engages clutch 106 against cover 102.

Chamber 108 is defined between cover 102 and a first axial side of piston plate 104, while chamber 110 is defined by a second axial side of the piston plate, opposite from the first side, and backing plate 112. Chamber 114 is defined by second axial side 161 of hub 150, which is directed in the opposite axial direction from the first axial side of the piston plate. Together, chambers 108 and 114 enable cooling of the torque converter, specifically to cool friction components, such as clutch 106. Chamber 110 may be referred to as the apply chamber, and it is used to control the axial movement of the piston plate, and therefore the opening and closing of the clutch. By axial direction, it is meant in a direction generally along the axis of rotation R. The clutch is controllable by pressurizing and depressurizing fluid in at least chamber 110, which creates a pressure difference on the axially opposite sides of piston plate 104 and causes the piston plate to move axially in accordance with this pressure difference. The cooling and apply chambers should be fluidly sealed from each other to maintain a pressure difference between them for axially actuating the piston plate. For simplicity, the fluid in chamber 108 will be referred to as the first or cooling fluid, while the fluid in chamber 110 will be referred to as the second, or apply fluid.

In the embodiment shown, the first fluid in chamber 108 is in fluid communication with chamber 114 of the torque converter, located generally on the axially opposite side of hub 150. Chamber 110 is generally located axially between chambers 108 and 114, but is fluidly sealed from these chambers. Further, chamber 110 is in fluid communication with an interior cavity of a hollow input shaft (not shown) of the torque converter, which is arranged along axis of rotation R and in driving connection with a transmission of an automobile which includes torque converter 100. That is, the first and second fluids will cross paths as the fluids travel through hub 150. The first fluid is supplied to and from chamber 114 via channel 115. The second fluid is supplied to and from the hollow input shaft via an orifice in the input shaft generally near area 116 between interior flange 162 of flow separation hub 150 and cover 102. Since the first fluid is contained outside the input shaft, namely between a stator shaft and the input shaft, and the second fluid contained inside the input shaft, the fluid separation between the two fluids is maintained.

Generally, hub 150 is included to enable the first and second fluids to be fluidly sealed from each other, while maintaining fluid communication between chambers 108 and 114, and also between chamber 110 and the hollow input shaft.

Figure 3:
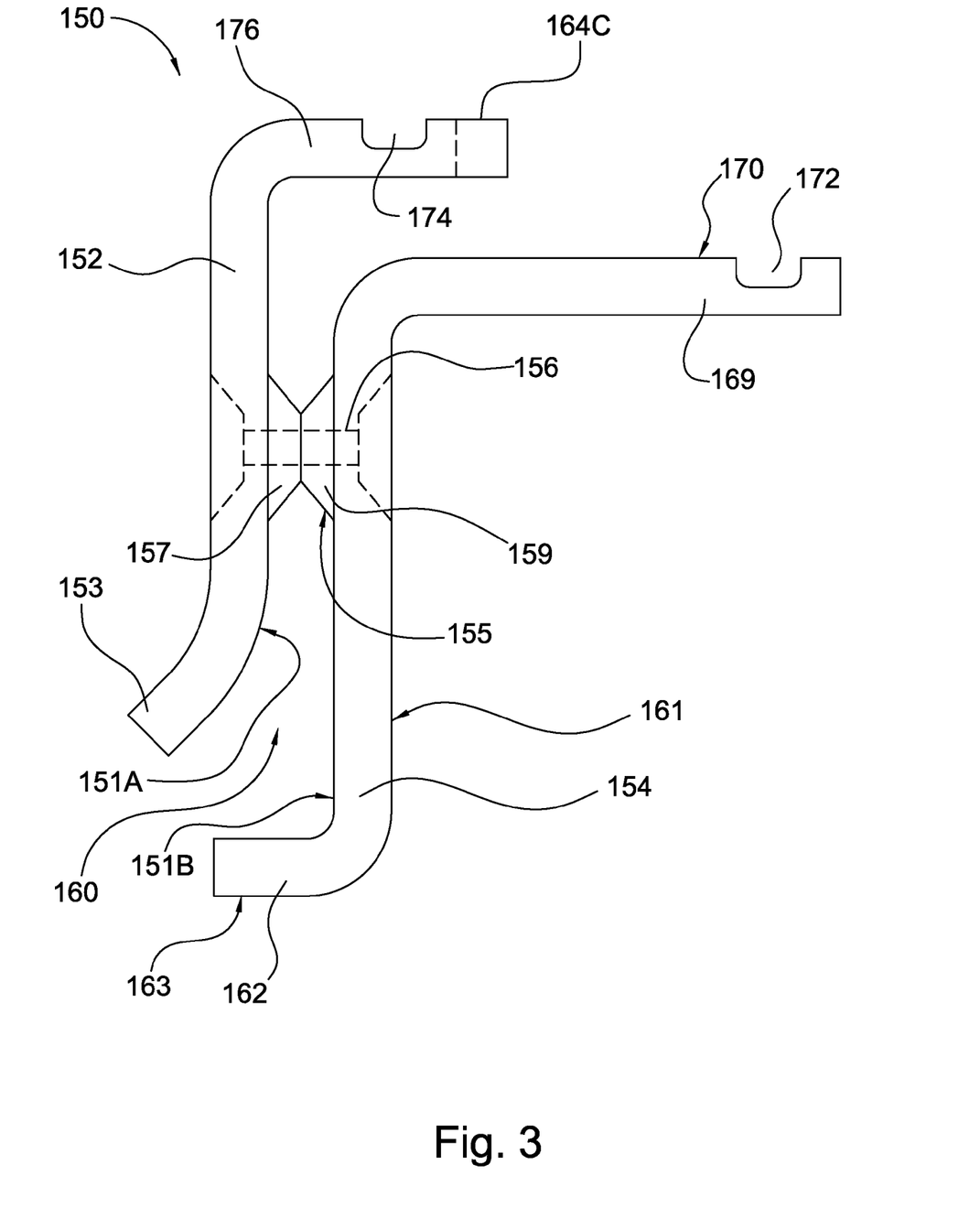
FIG. 3 is a cross-section of the current invention two-piece flow separation hub.
Figure 4:
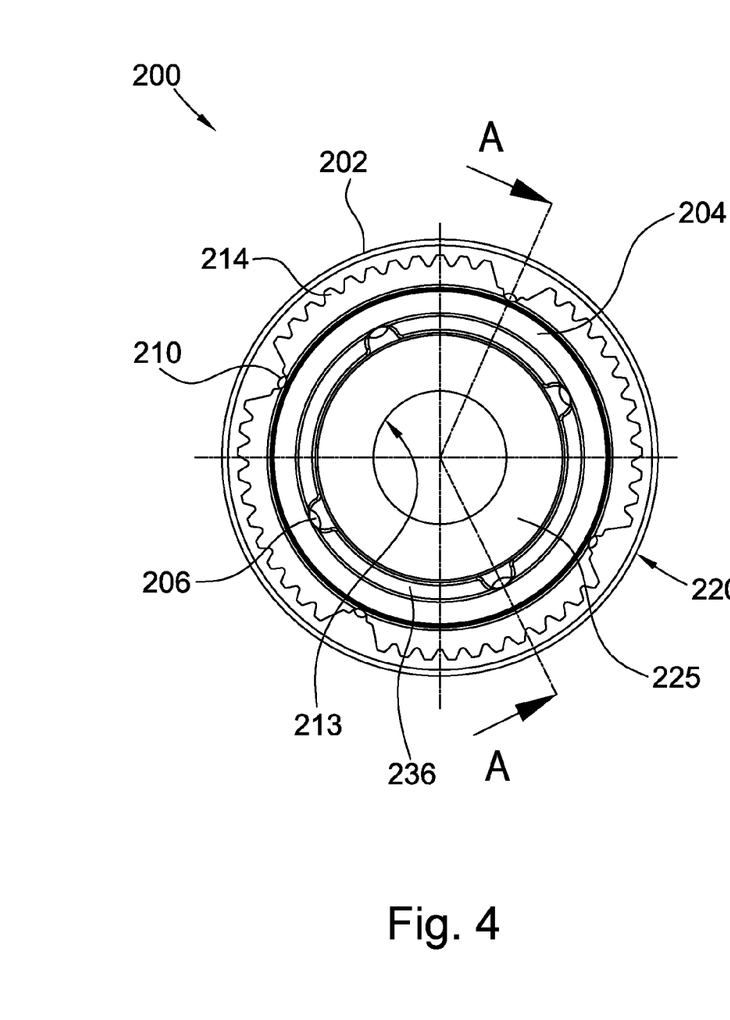
FIG. 4 is an elevation of a first axial side of the flow separation hub.
Figure 5:
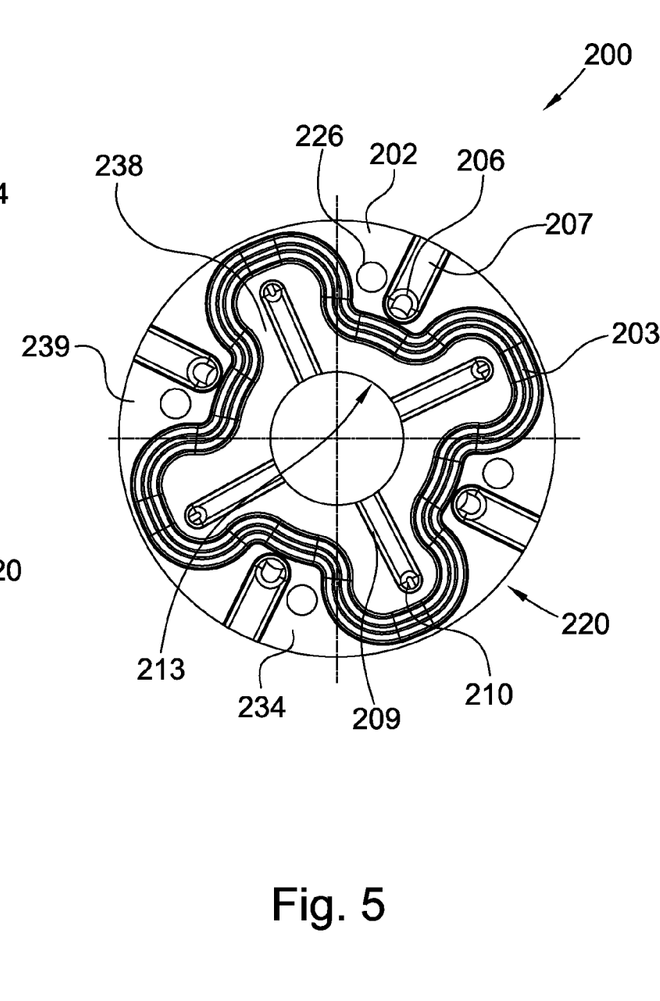
FIG. 5 is an elevation of a second axial side of the flow separation hub.

Unlike prior art hubs, flow separation hub 150 is made from two separate plates or components, 152 and 154, respectively. Each component is generally an annular plate which is installed in the torque converter concentrically with axis of rotation R. First hub component 152 is affixed to second hub component 154 via hollow protrusion 155. First hub component 152 is also affixed to cover 102 via projection 153. In one embodiment, a plurality of hollow protrusions 155 is included at discrete locations about one or both of the first and second hub components. By discrete locations, it is meant that the hollow protrusions do not form a continuous closed loop about the hub components, so that the second fluid can flow around the hollow protrusions and traverse the second passage. In FIGS. 3 and 4, hollow protrusion 155 is formed by raised pads 157 and 159 on the first and second hub components, respectively. In another embodiment, hollow protrusion 155 could be formed by a protrusion or raised pad on only a single hub component, or a separate component affixed between the first and second hub components. In other embodiments, the hollow protrusion could be a blind extruded hollow rivet, or the like.

Passage 156 is defined by the hollow protrusion, and is arranged to enable the first fluid to run through the first and second hub components, particularly so that chambers 108 and 114 are in fluid communication. Accordingly, to create passage 156, each hub component 152 and 154, and hollow protrusion 155 has an aperture through which the fluid can pass. Hollow protrusion 155 could be made, for example, most advantageously by simultaneously stamping the protrusion and the aperture into one or both hub components, although other methods could be utilized. For example, a hollow rivet could be used to affix the first and second hub components.

Passage 160 is defined between the opposing faces 151A and 151B of the first and second hub components, respectively. Since hollow protrusion 155 are only at discrete locations about the first or second hub component, the second fluid can flow about and around hollow protrusions 155 to enable fluid communication between the input shaft and chamber 110. Doubled-headed arrow 178 is included to show the general flow direction of the first fluid through hub 150 via passage 156, while double-headed arrow 180 is included to show the general flow direction of the second fluid through hub 150 via passage 160. In the embodiment shown, first passage 156 enables the first fluid to flow in a substantially axial direction between first and second axial sides, while second passage 160 enables the second fluid to flow in a substantially radial direction between an inner and an outer diameter.

To ensure that the first and second fluids remain fluidly sealed from each other, the hub should be sealed against the input shaft, cover 102, piston plate 104, and backing plate 112. In the embodiment shown, first hub component 152 includes projection 153 which protrudes axially from the component 152. In one embodiment, the first hub component is welded to the cover by projection welding, so projection 153 should be angled with respect to cover 102, so only a tip or point of the hub component contacts cover 102. In such an embodiment, if enough electric current can be supplied, it may be advantageous to simultaneously weld second hub component 154 to first hub component 152, and first hub component 152 to cover 102 by placing one welding electrode on surface 161 of the second hub component, and the second welding electrode on the outer surface of cover 102. In this way, the current flows from projection 155, welding together the first and second hub components, and also simultaneously through projection 153, welding together the cover and the first hub component.

Figure 2:
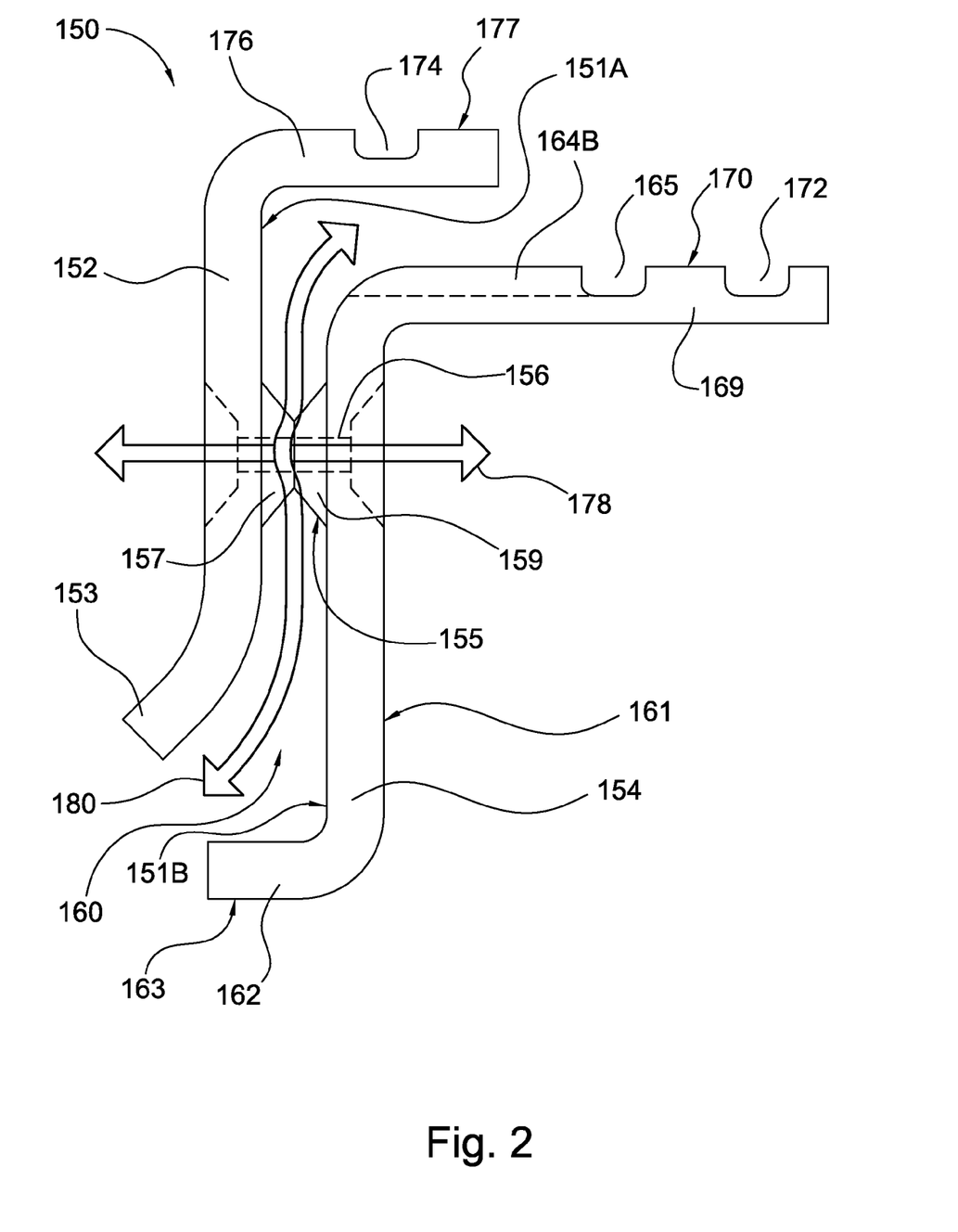
FIG. 2 is a cross-section of the current invention two-piece flow separation hub.

Interior flange 162 of hub component 154 is generally arranged in the axial direction. Inner diameter 163 of the flange is arranged so that it seals against the outer surface of the input shaft of torque converter 100, thus maintaining separation of the second fluid in passage 160 from the first fluid located on the opposite side of second hub component, namely the side defined by surface 161. In one embodiment, diameter 163 may be sealed against a sealing bushing, with the bushing sealed against the input shaft. Likewise, flange 169 of second hub component 154 includes surface 170 against which backing plate 112 is press fit, to fluidly seal chamber 110 from a working chamber of the torque converter on the opposite axial side of backing plate 112. As shown in FIG. 2, snap ring 166 may be included in groove 172 for preventing axial displacement of the backing plate when pressure is applied to engage the piston plate. Seal 168 is included in seal gland 174 of flange 176 of the first hub component to dynamically seal the first hub component and piston plate together. Specifically, this maintains the separation between the first fluid in chamber 108 which is on a first axial side of the piston plate, and the second fluid in chamber 110, which is on a second axial side of the piston plate, opposite from the first side. Thrust bearing or washer 117 may be included to engage against surface 161 for supporting axial movement of hub 150.

In the embodiment shown, hub 150 also includes a means for transmitting torque between the hub and the piston plate, generally designated reference number 164. In FIG. 1, the torque transmitting means comprises splines 164A in flange 176 of first hub component 152. In FIG. 2, the piston plate extends past flange 176, and engages with splines 164B in flange 169 of second hub component 154. In one embodiment, it may be advantageous to include a groove 165, to assist in the removal of metal chips or shavings that result when flange 169 is broached to form splines 164B. Lastly, FIG. 3 shows carrier tabs 164C, which are included at the end of flange 176 of hub component 152, which are arranged to drivingly engage with the piston plate in a torque transmitting manner. It should be appreciated that the embodiments shown should not be considered limiting, but that additional embodiments or variations on these embodiments may be utilized to properly seal and engage hub 150 in a torque converter, and these additional embodiments are within the scope of the current invention.

It should be appreciated that there are numerous ways to manufacture hub 150, although the design shown in FIGS. 1-3 is particularly arranged for being most advantageously manufactured by stamping, since this process can make all of the necessary features of each the first and second hub components simultaneously. However, other processes could be used to make a two part hub which enables a similar separation of fluid flow through the hub. For example, a second embodiment two-piece flow separation hub, designated hub 200, is shown in FIGS. 4-17. Hub 200 is arranged to be most advantageously manufactured by a powder metal sintering process, although other processes could be used. Unless the powder metal parts are machined (e.g., drilled) after sintering, holes or bores arranged radially in the middle of the part are not feasible. Due to these manufacturing considerations the particular arrangement of hub 200 appears quite different from that of hub 150, however hub 200 includes many analogous components to hub 150, as both hubs are arranged to be installed in the same location and provide the same functionality as described with respect to FIG. 1.

Referring now to FIGS. 4-9, hub 200 includes first and second hub components 202 and 204, respectively, and is arranged to enable separate flows of first and second fluids through the hub. First hub component 202 includes projection 203, which forms a closed pattern that generally divides axial side 234 into radially inner and outer areas 238 and 239, respectively. Projection 203 is arranged to be affixed to a cover of the torque converter, such as by projection welding. Specifically, if projection welding is utilized, one electrode would be engaged against welding surface 236 of second hub component 204 and the other electrode against cover 102, and an electric current passed through hub 200 to weld projection 203 to cover 102. Since projection 203 is arranged to be welded to the cover, it may flatten against the cover during the welding process. For this reason, surface 234 will act as a stop, so that the hub at most lies flush against the cover.

Since it is foreseeable that projection 203 may conform to the cover in such a way that surface 234 lies flush against the cover, in one embodiment, channels 207 and 209 are included to ensure sufficient fluid can flow between surface 234 and the cover of the torque converter. Channels 207 are arranged radially outside of projection 203 in outer area 239, and channels 209 are arranged radially inside of projection 203 in inner area 238. Channels 207 run radially from outer diameter 220 of component 202 to bores 206. Channels 209 run radially from inner diameter 213 of hub component 202 to bores 210. Bores 206 are formed by bores 206A and 206B in the first and second hub components, respectively, while bores 210 are formed by bores 210A and 210B in the first and second hub components, respectively. That is, once bores 210A and 210B and bores 206A and 206B are aligned, the first and second hub components are matingly engaged and affixed together along interface 205. In the embodiments shown, bores 206B and 210B resemble notches or channels, so it should be understood that any such element providing for the absence of material is included in the meaning of the term "bore" used throughout the description of the current invention.

In one embodiment, the first and second hub components are affixed by brazing. In one embodiment, hub component 202 includes bores 226 for the addition of braze pellets. After the first and second hub components are aligned and matingly engaged at interface 205, bores 226 may be filled with braze pellets to assist in the brazing process. Alternatively or additionally, braze paste could be applied at interface 205 between the hub components before the hub components are matingly engaged together, or the hub components could be affixed in some other suitable manner.

First hub component 202 of hub 200 is sealed against a piston plate of a torque converter by a seal (not shown) installed into groove 224 (similar to seal 174 of hub 150). Second hub component 204 of hub 200 is sealed against a backing plate of a torque converter by the backing plate being press fit against surface 223 of the second hub component (similar to surface 170 of hub 150), and a snap ring may be included to prevent axial movement of the backing plate, which snap ring is retained in groove 222 (similar to groove 172 of hub 150). The piston plate is engaged with splines 214 for enabling the transmission of torque from the first hub component to the piston plate (similar to spines 164 of hub 150). Surface 225 is arranged to be engageable with a thrust washer or bearing, such as thrust washer or bearing 117, to support axial movement of hub 200.

Figures 6, 7:
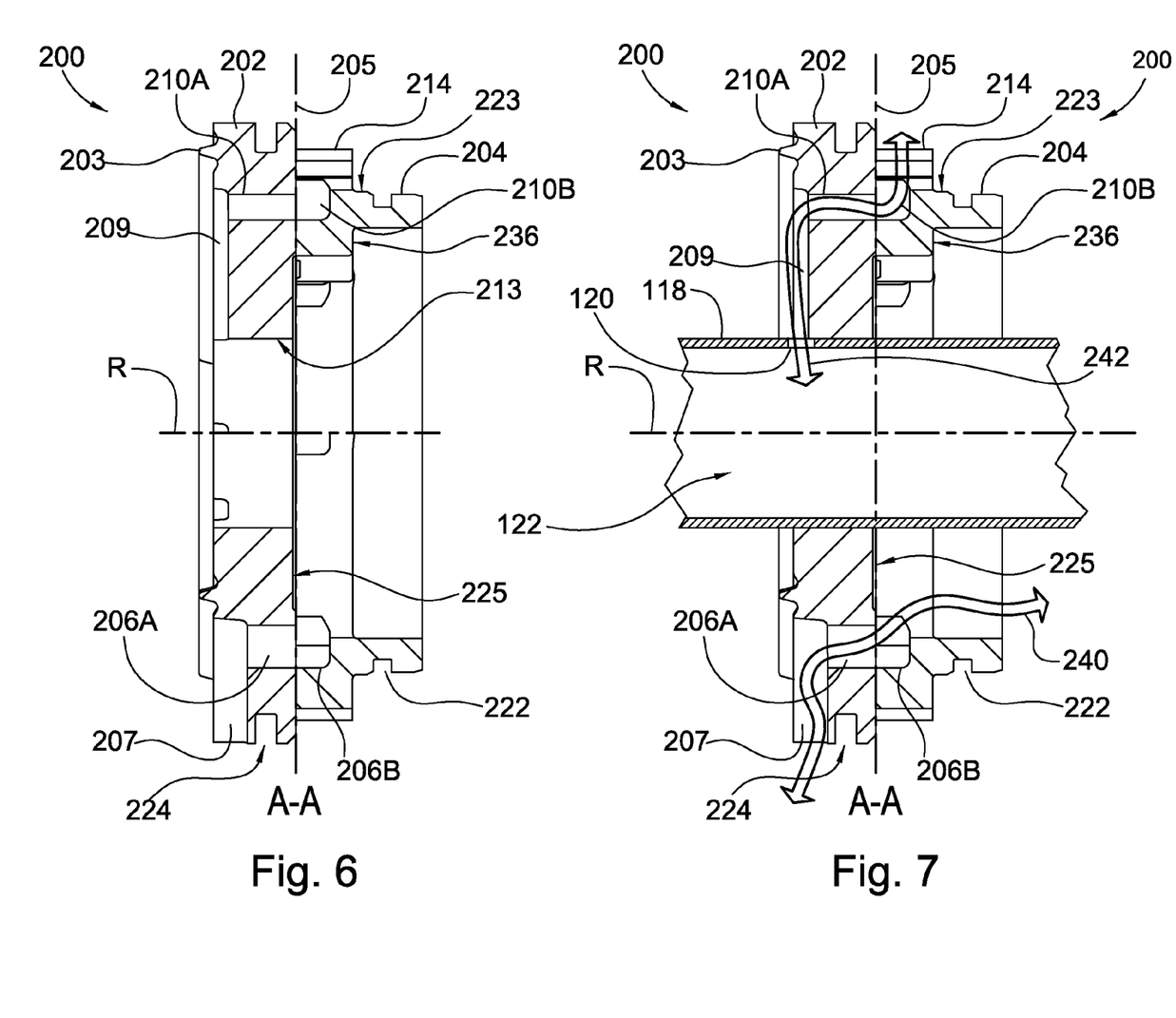
FIG. 6 is a cross-section of the hub generally taken along line A-A in FIG. 4.
FIG. 7 is a cross-section of the hub generally taken along line A-A in FIG. 4, but with the hub installed on an input shaft of a torque converter.
Figure 8:
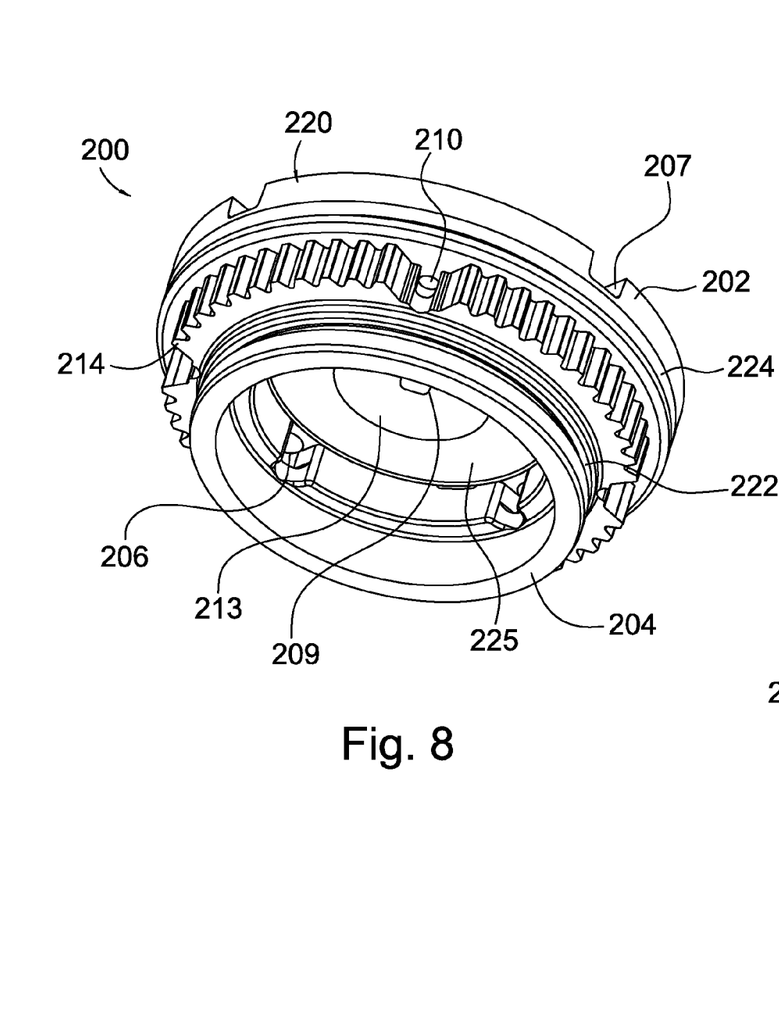
FIG. 8 is a perspective view of the hub shown in FIG. 4.
Figure 9:
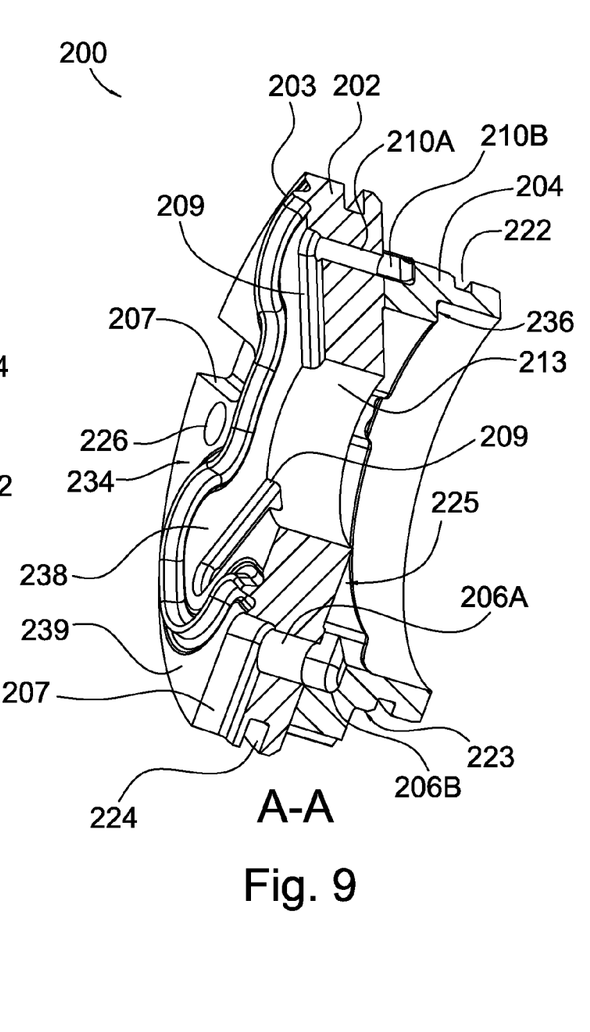
FIG. 9 is a perspective view of the hub, with a cutaway generally along line A-A in FIG. 4.
Figures 10, 11:
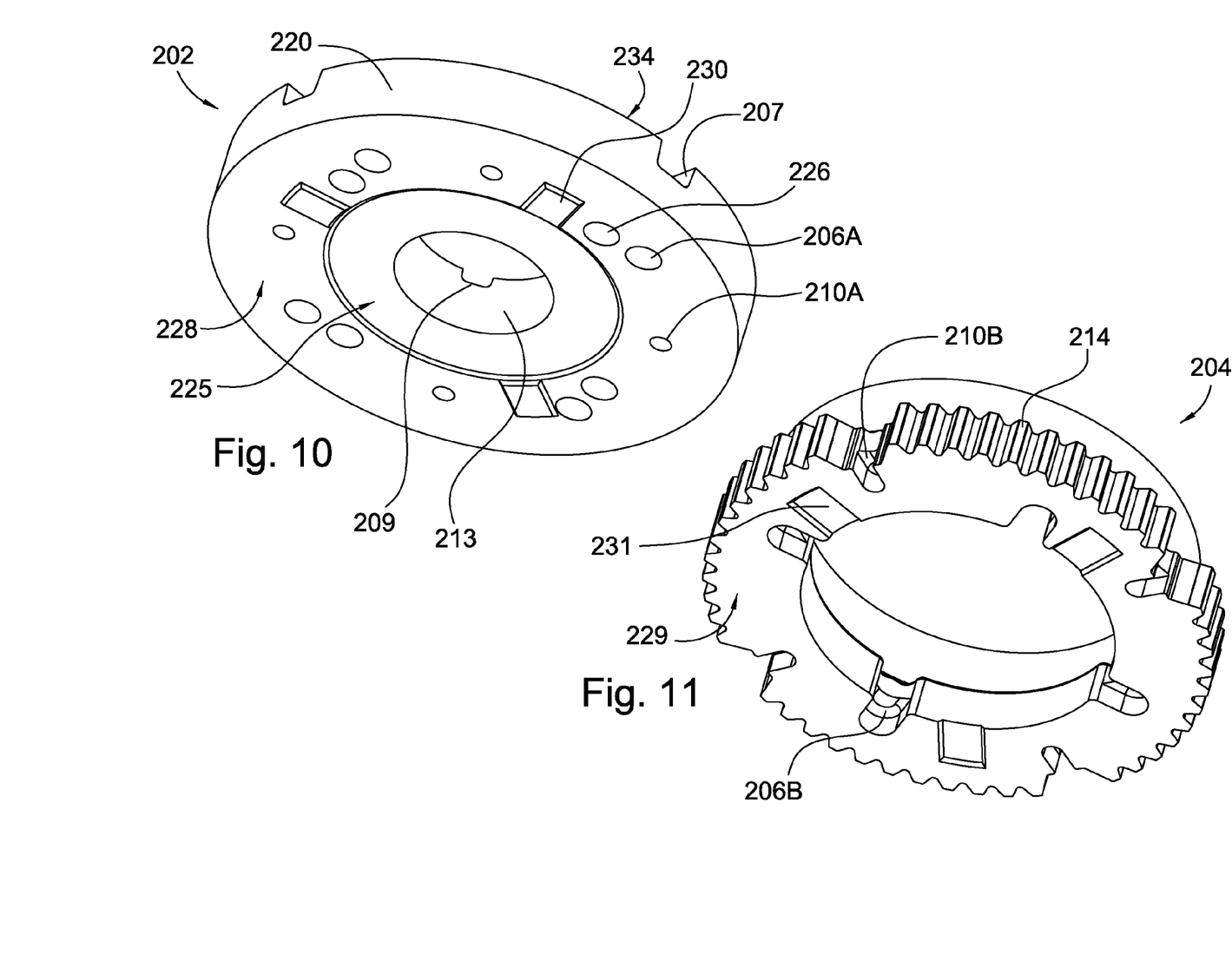
FIG. 10 is a perspective view of a first component of the hub shown in FIG. 8.
FIG. 11 is a perspective view of a second component of the hub.
Figures 12, 13:
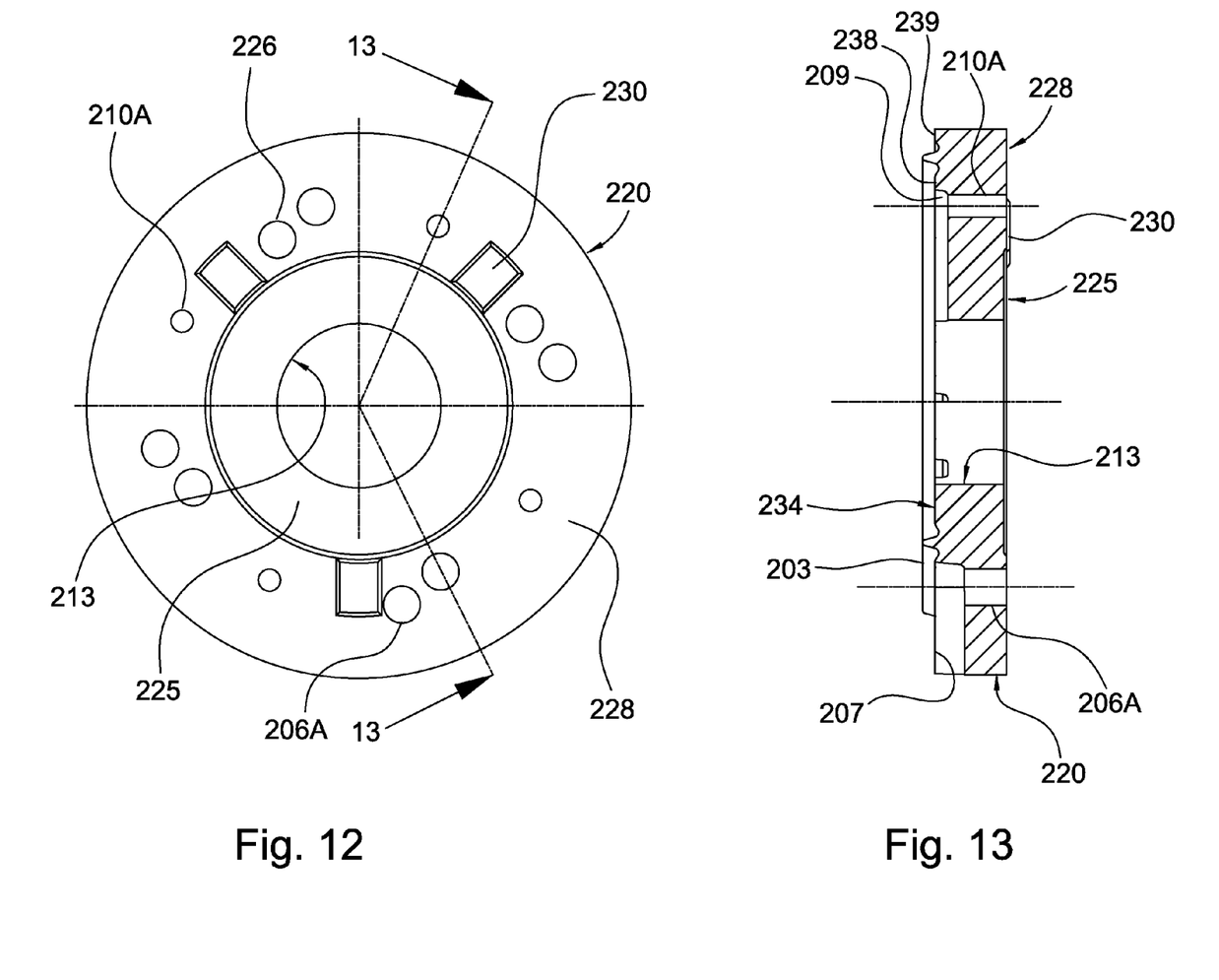
FIG. 12 is an elevation of the mating surface of the first hub component shown in FIG. 10.
FIG. 13 is a cross-sectional view of the first hub component taken generally along line 13-13 in FIG. 12.
Figure 14:
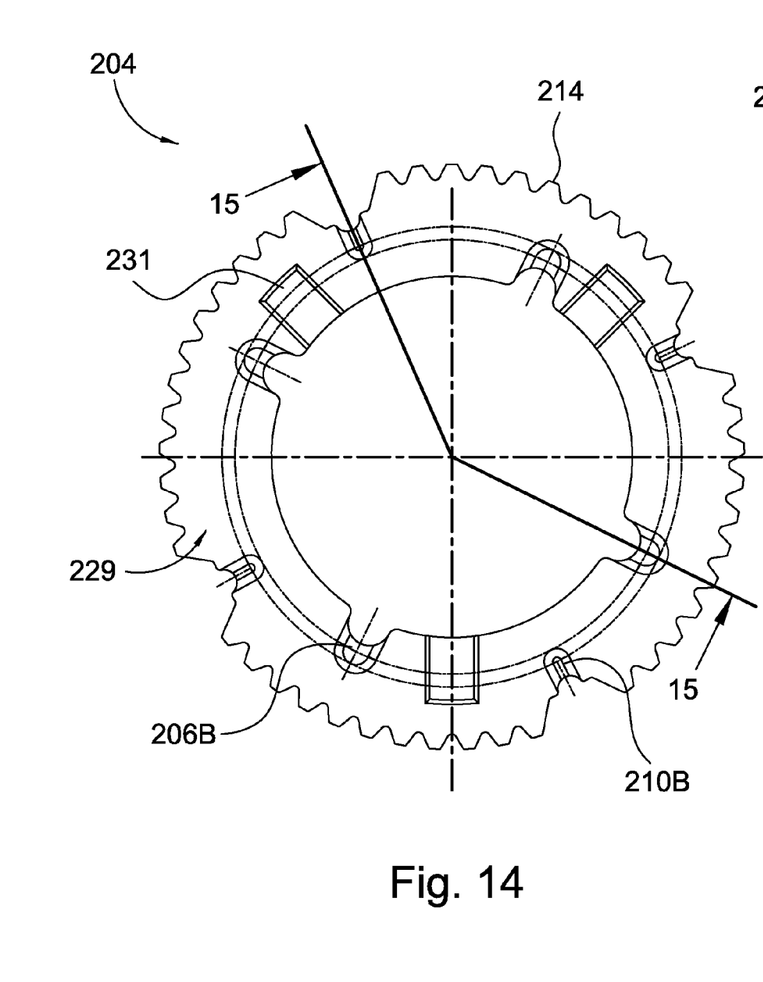
FIG. 14 is an elevation of the mating surface of the second hub component shown in FIG. 11.
Figure 15:
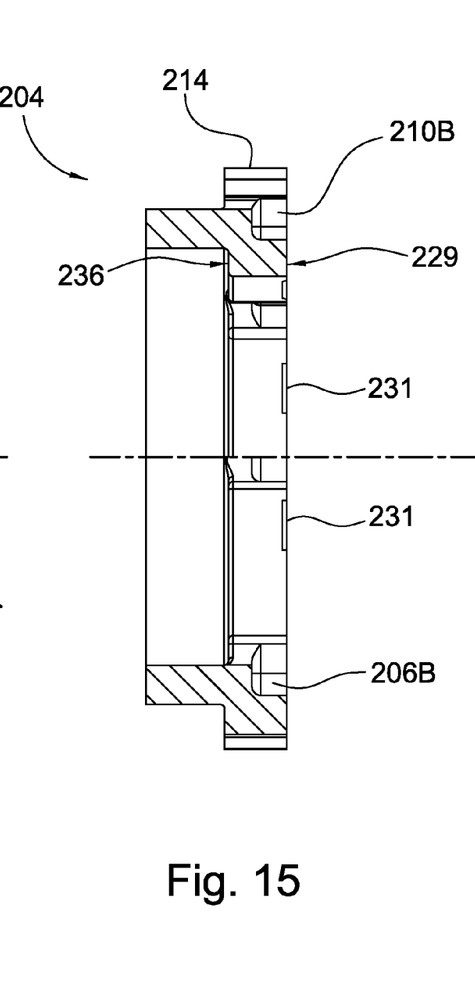
FIG. 15 is a cross-sectional view of the first hub component taken generally along line 15-15 in FIG. 14.

Surface 213 is arranged to be sealed against the input shaft of the torque converter, or against a bushing seal that is sealed against the input shaft of the torque converter (similar to surface 163 of flange 162 of hub 150). Referring specifically to FIGS. 6 and 7, the first fluid flows from a cooling chamber on a first axial side of the piston plate (e.g., chamber 108) down channels 207 and through bores 206, into a chamber on the opposite axial side of the hub (e.g., chamber 114). It should be appreciated that the fluid can freely flow in both directions (between chambers 108 and 114) as indicated by double headed arrow 240. The second fluid flow generally flows from chamber 122 in hollow input shaft 118 of the torque converter, such as torque converter 100, out orifice 120, down channels 209 and through bores 210, into the apply chamber defined between the piston plate and backing plate (e.g., chamber 110). Again, the second fluid can freely flow in both directions (between chambers 110 and 122), as indicated by double headed arrow 242. The second fluid is sealed between the hub and the cover of the torque converter by projection 203, which is affixed to the cover. Accordingly, the first fluid is fluidly sealed and kept separated from the second fluid.

FIGS. 10-15 more clearly describe interface 205 and the mating surfaces of the two hub components, which are hidden when hub 200 is fully assembled. Surface 228 on first hub component 202 and surface 229 on second hub component 204 are arranged to be matingly engaged and affixed together. That is, surfaces 228 and 229 generally define interface 205. To ensure that bores 206A align with bores 206B and bores 210A align with 210B, tabs 230 are included in the first hub component. Complementary shaped recesses 231 are included on the second hub component to receive tabs 230. It should be appreciated that the tabs and recesses could be switched between the first and second components, and that these elements could take any size, shape, or arrangement suitable for alignment purposes. Thrust surface 225 is shown slightly recessed from mating surface 228 to create a small lip for better engagement with a thrust bearing or washer. Although bores 206A and 210 align with corresponding bores 206B and 210B, in the embodiment shown, bores 226 do not align with bores in the second hub component, but instead terminate against mating surface 229. As described above, braze pellets are placed in bores 226 if the first and second hub components are brazed together. During brazing, the pellets will melt, affixing the hub components together at interface 205.

Figure 16:
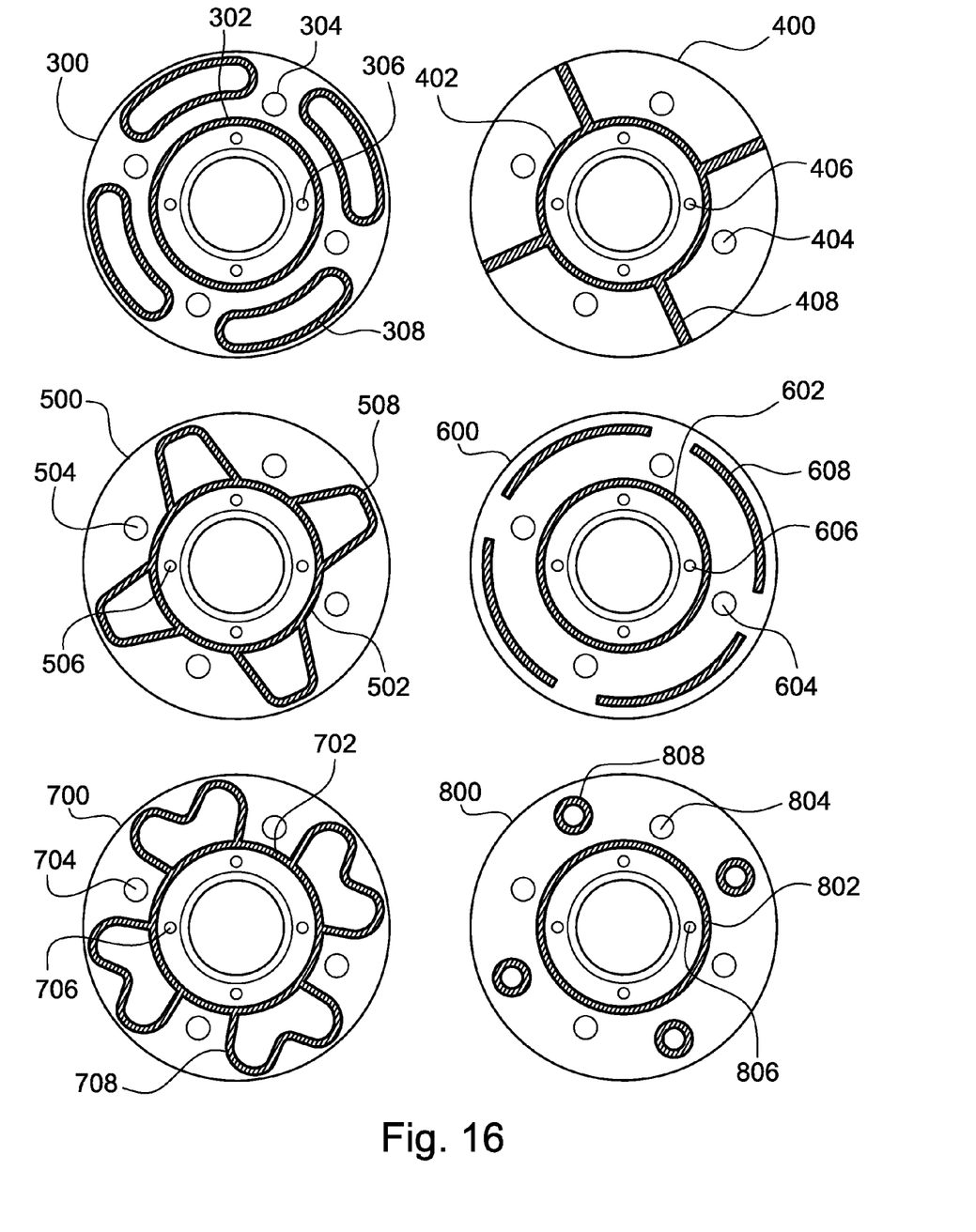
FIG. 16 illustrates alternate embodiments of a first axial surface of the flow separation hub according to the current invention; and, FIG. 17 illustrates alternate embodiments of a flow separation hub having different interfaces of separation.

It should be appreciated that projection 203 can take a variety of different shapes. A variety of alternate embodiments for projection 203 are shown in FIG. 16, namely, included on hubs 300, 400, 500, 600, 700, and 800. At a minimum, the projection should define radially inner and radially outer areas, which separate the first fluid passage from the second fluid passage. Projections 302, 402, 502, 602, 702, and 802 are each arranged as a closed loop to separate the first passage from the second passage, namely first passage bores 304, 404, 504, 604, 704, and 804 from second passage bores 306, 406, 506, 606, 706, and 806, respectively. In the embodiments shown, additional weld features are included to increase the welded surface area between the cover and the hub, to ensure a more durable weld. Specifically, weld features 308, 408, 508, 608, 708, and 808 are included to increase the welded surface area and generally provide welding and support between the inner and outer diameters of the hub.

Figure 17:
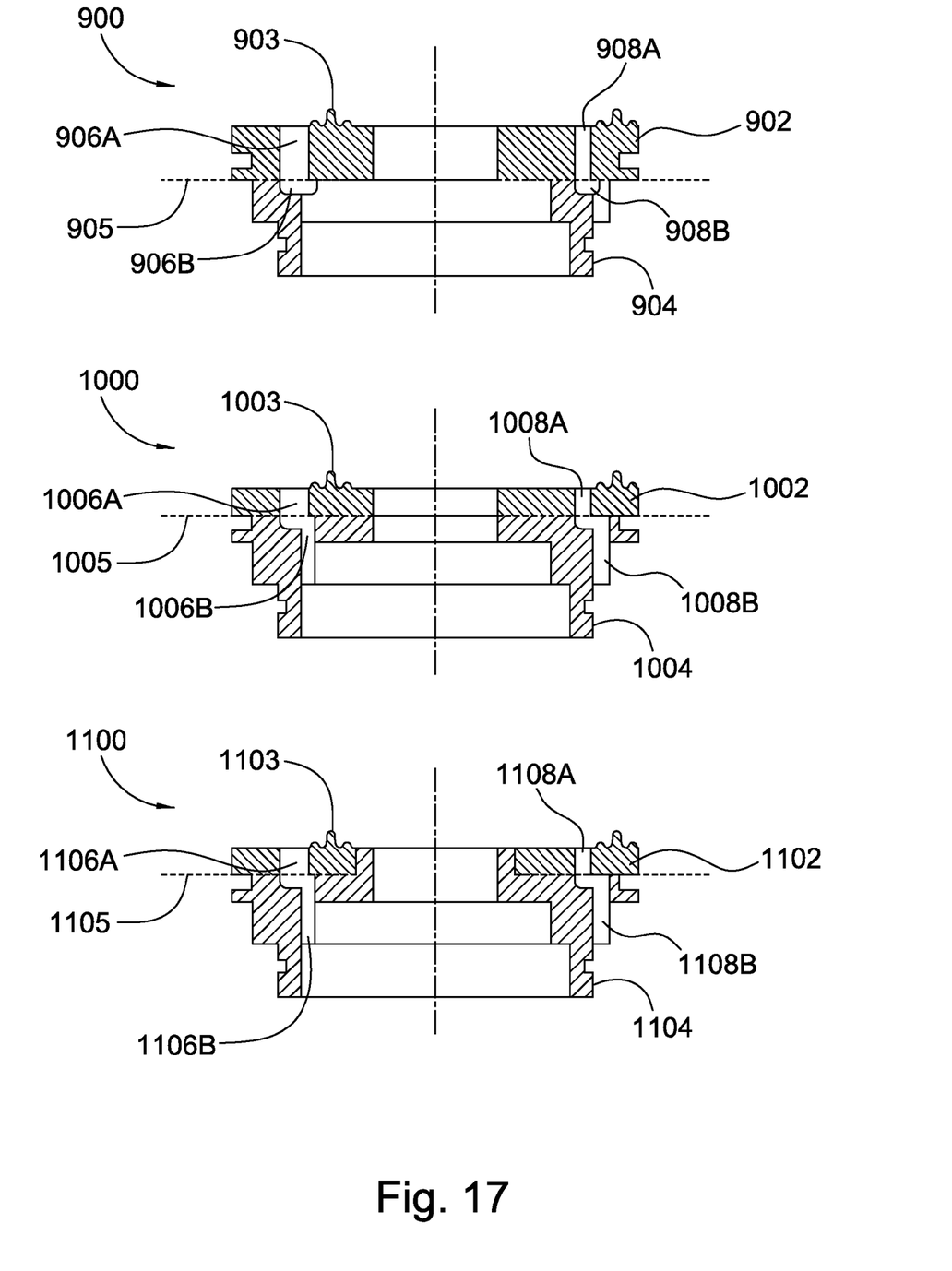

It should also be appreciated that the first and second hub components can be arranged along a differently defined line of separation. That is, interface 205 can be differently defined if the shapes of the first and second hub component are chosen differently. FIG. 17 is included to illustrate some of the other possible arrangements of a hub suitable to be manufactured by sintering powder metal according to the current invention. Hub 900 substantially resembles hub 200, having first and second hub components 902 and 904 affixed at interface 905, with bores 906A and 908A in the first hub component and bores 906B and 908B in the second hub component. Likewise, hubs 1000 and 1100 include first hub components 1002 and 1102, respectively, which include bores 1006A and 1008A, and 1106A and 1108A, respectively, affixed at interfaces 1005 and 1105 with second hub components 1004 and 1104, respectively, which include bores 1006B and 1008B, and 1106B and 1108B, respectively. One of ordinary skill in the art would readily recognize the above examples are not limiting, and that there are other alternatives within the spirit and scope of the current invention.

It should also be appreciated that a hub according to the current invention could be divided into more than two components. However, two components advantageously enables the current invention flow separation hub to be manufactured including all necessary elements in the fewest number of parts, without cross-drilling or other time intensive machining processes.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. A hub assembly for a torque converter comprising:
an axis of rotation;
a first hub component including:
   a first side extending in a radial direction orthogonal to the axis of rotation and facing in a first axial direction parallel to the axis of rotation;
   a second side facing in a second axial direction, opposite the first axial direction, wherein a first line orthogonal to the axis of rotation is parallel to the second side;
   a first plurality of channels formed in the second side and open to the second side;
   a first plurality of bores, each bore in the first plurality of bores connecting the first and second sides;
   a second plurality of channels formed in the second side and open to the second side; and,
   a second plurality of bores, each bore in the second plurality of bores connecting the first and second sides;
a second hub component including:
   a third side:
      facing the second axial direction, wherein a second line orthogonal to the axis of rotation is parallel to the third side; and,
      fixedly secured to the first side;
   a third plurality of bores, each bore in the third plurality of bores connected to a respective bore from the first plurality of bores; and,
   a fourth plurality of bores, each bore in the fourth plurality of bores connected to a respective bore in the second plurality of bores.

2. The hub assembly of claim 1, wherein:
the first hub component includes:
   a first radially outermost circumference; and,
   a first central opening through which the axis of rotation passes;
said each channel in the first plurality of channels:
   includes a first radial end opening to the first central opening;
   extends outward, in the radial direction, from the first radial end to a second radial end, the second radial end separated from the first outermost circumference by material forming the first hub component;
each bore in the first plurality of bores:
   includes a first axial end open to a respective second radial end;
   includes a second axial end open to the first side; and,
   is separated from the first radially outer circumference and the first central opening by the material forming the first hub component;
each channel in the second plurality of channels:
   includes a third radial end opening to the first outer circumference;
   extends inward, in the radial direction, from the third radial end to a fourth radial end;
each bore in the second plurality of bores:
   includes a third axial end open to a respective fourth radial end;
   includes a fourth axial end open to the first side; and,
   is separated from the first radially outer circumference and the first central opening by material forming the first hub component;
the second hub component includes a second radially outermost circumference;
each bore in the third plurality of bores:
   extends in the first axial direction;
   forms a respective portion of the second radially outermost circumference; and,
   includes a fifth axial end connected to a respective second axial end; and,
each bore in the fourth plurality of bores:
   extending in the first axial direction;
   open toward the axis of rotation in the radial direction; and,
   including a sixth axial end connected to a respective fourth axial end.

3. A flow separation hub comprising:
an axis of rotation;
a first hub component including:
   a first radially outermost circumference;
   a first central opening through which the axis of rotation passes;
   a first side extending in a radial direction orthogonal to the axis of rotation and facing in a first axial direction parallel to the axis of rotation;
   a second side extending in the radial direction and facing in a second axial direction, opposite the first axial direction;
   a first plurality of channels, each channel in the first plurality of channels:
      formed in the second side; and,
      including:

a first radial end; and
a second radial end open to the first central opening;
a first plurality of bores, each bore in the first plurality of bores including:
a first axial end directly connected to a respective first radial end; and,
a second axial end open to the first side;
a second plurality of channels, each channel in the second plurality of channels:
formed in the second side; and,
including:
a third radial end; and,
a fourth radial end open to the first radially outermost circumference;
a second plurality of bores, each bore in the second plurality of bores including:
a third axial end directly connected to a respective third radial end; and,
a fourth axial end open to the first side; and,
a second hub component affixed to said first hub component and including:
a second radially outermost circumference;
at least a portion aligned with the first hub component in the first axial direction;
a third plurality of bores, each bore in the third plurality of bores:
forming a respective portion of the second radially outermost circumference; and,
including a fifth axial end directly connected to a respective second axial end; and,
a fourth plurality of bores, each bore in the fourth plurality of bores:
open toward the axis of rotation in the radial direction; and,
including a sixth axial end directly connected to a respective fourth axial end.

4. The flow separation hub recited in claim 3, wherein:
said first and second hub components are matingly engaged at an interface;
said first plurality of bores is aligned with said third plurality of bores at said interface;
said second plurality of bores is aligned with said fourth plurality of bores at said interface such that a second line parallel to the axis of rotation passes through the second and fourth pluralities of bores without intersecting the respective material forming the first and second hub components; and,
said first and second hub components are affixed together at said interface.

5. The flow separation hub recited in claim 4, wherein said first and second hub components are each formed by a powder metal sintering process.

6. A flow separation hub comprising:
an axis of rotation;
a first hub component including:
a first radially outermost circumference;
a first central opening through which the axis of rotation passes;
a first side facing in a first axial direction parallel to the axis of rotation;
a second side facing in a second axial direction, opposite the first axial direction;
a first plurality of channels formed in the second side;
a first plurality of bores passing through material forming the first hub component, an entirely of each bore in the first plurality of bores separated from the first radially outermost circumference by the material forming the first hub component;
a second plurality of channels formed in the second side;
a second plurality of bores passing through the material forming the first hub component, an entirely of each bore in the second plurality of bores separated from the first radially outermost circumference by the material forming the first hub component;
a second hub component affixed to said first hub component and including:
a second radially outermost circumference;
a third plurality of bores forming respective portions of the second radially outermost circumference; and,
a fourth plurality of bores, wherein:
for each channel in the first plurality of channels, a respective first line starting at the axis of rotation and orthogonal to the axis of rotation passes through the channel to a radially outermost portion of the channel without intersecting the material forming the first hub component; and,
for each channel in the second plurality of channels, a respective first line starting at the first radially outermost circumference and orthogonal to the axis of rotation passes through the channel and extends toward the axis of rotation to a radially innermost portion of the channel without intersecting the material forming the first hub component.

7. The flow separation hub of claim 6, wherein:
a third line parallel to the axis of rotation:
passes though the first and second sides and a bore from the first plurality of bores without intersecting the material forming the first hub component; and,
passes through a bore from the third plurality of bores into the material forming the second hub component; and,
a fourth line parallel to the axis of rotation:
passes though the first and second sides and a bore from the second plurality of bores without intersecting the material forming the first hub component; and,
passes through a bore from the fourth plurality of bores into the material forming the second hub component.

* * * * *